United States Patent Office 2,946,413
Patented July 26, 1960

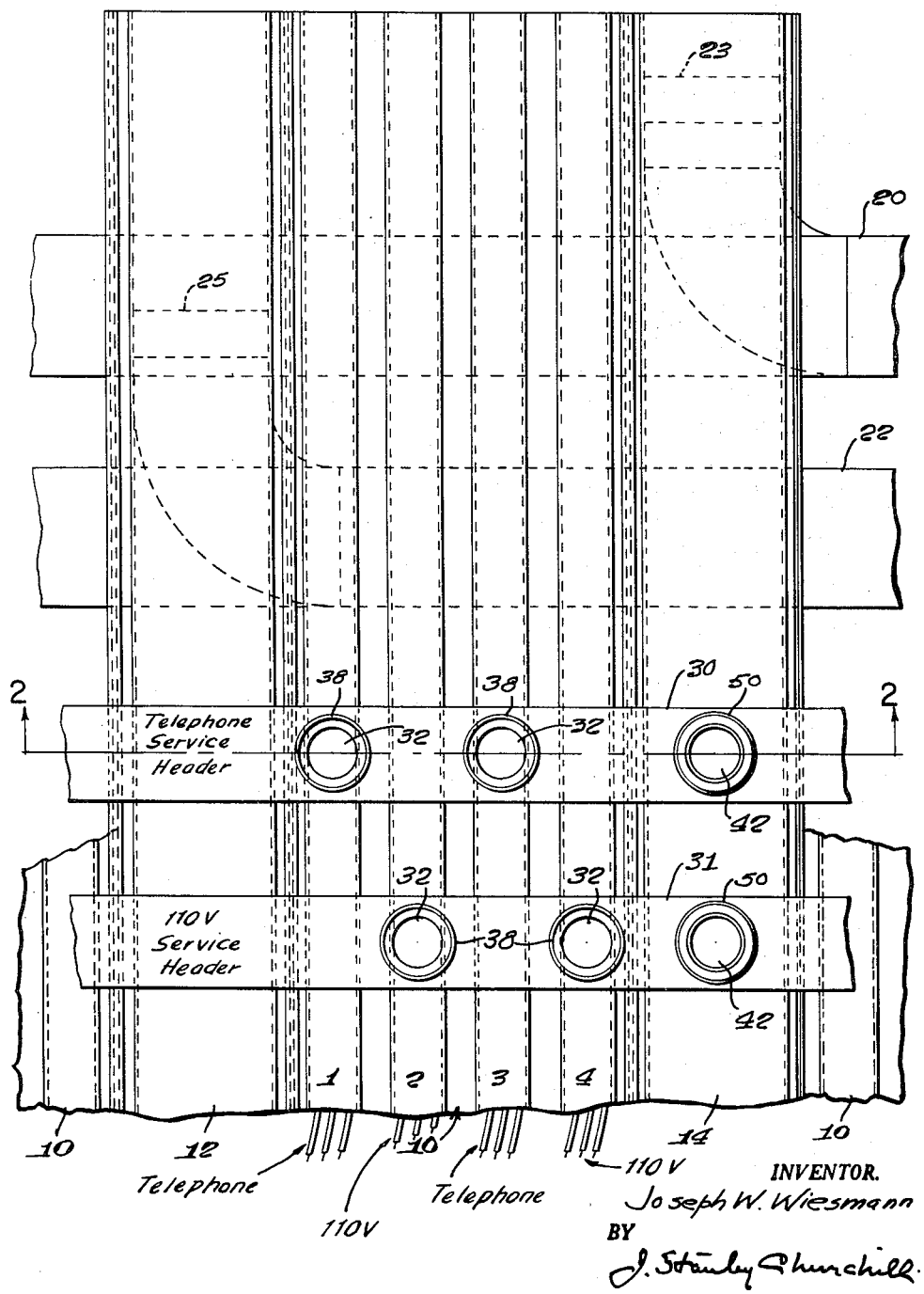

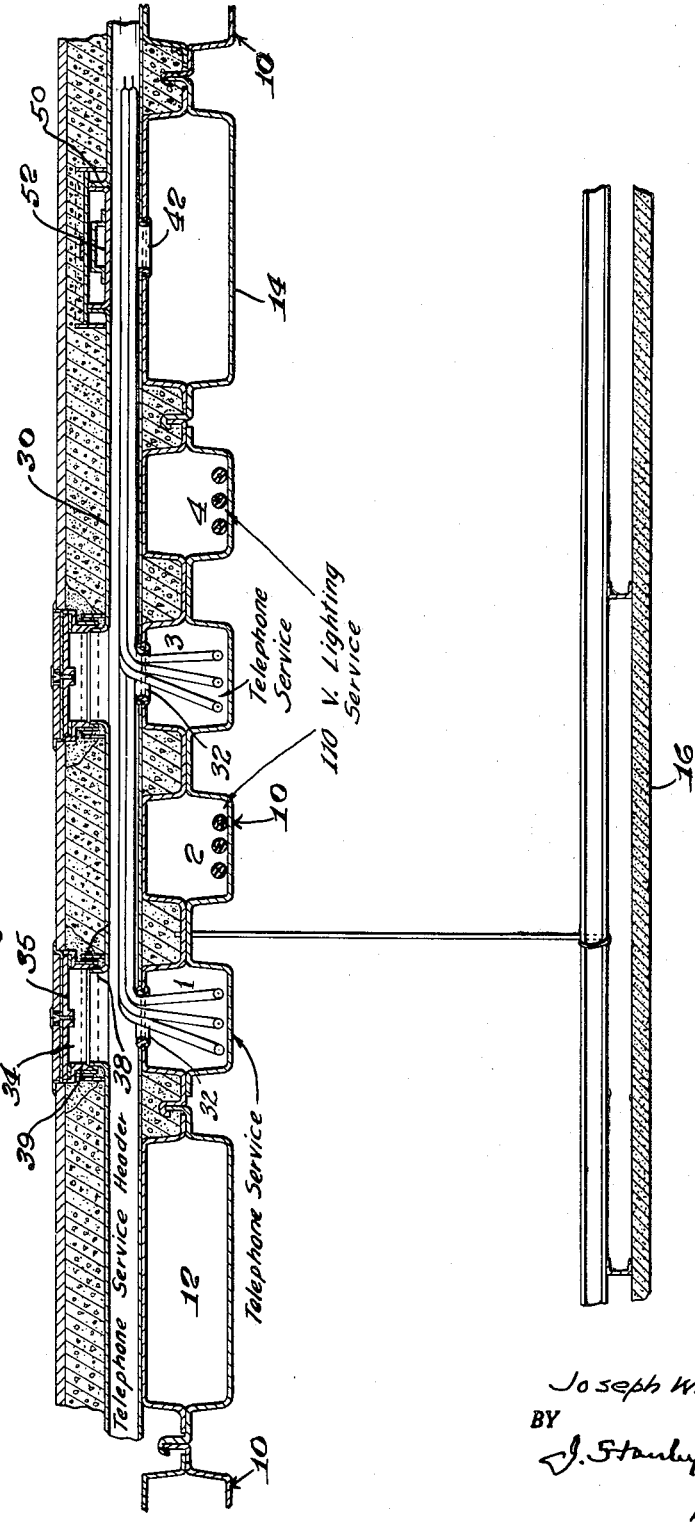

2,946,413

BUILDING AND COMBINATION AIR AND WIRE DISTRIBUTING STRUCTURE

Joseph W. Wiesmann, Pittsburgh, Pa., assignor to H. H. Robertson Company, Pittsburgh, Pa., a corporation of Pennsylvania Filed July 12, 1955, Ser. No. 521,441

1 Claim. (Cl. 189—34)

This invention relates to a building and combination air and wire distributing structure.

One object of the invention is to provide a novel building and combination air and wire distributing structure embodying a metallic cellular load supporting floor including a plurality of generally parallel cells forming potential air and wire distributing conduits which enables selected of the cells forming the potential air conduits to be used to distribute cooled air and heated air and other cells to be used as wire distributing cells with provision for servicing the wire distributing cells in a manner such as to minimize the excessive heating of the wiring and thereby prevent injury to the insulation thereof.

A further object of the invention is to provide a novel building and combination air and wire distributing structure of the character described embodying cellular metal floors of the type illustrated in the United States patent to Young, No. 1,867,433, and in which provision is made for servicing the various wiring cells by means of transversely extended headers or crossover ducts having communication with selected of the cooled air ducts whereby to dissipate the heat transmitted thereto from the hot air cells to the headers and to thereby prevent injury to the wiring extending therethrough.

With these general objects in view and such others as may hereinafter appear the invention consists in the building and combination air and wire distributing structure hereinafter described and particularly defined in the claim at the end of this specification.

In the drawings illustrating the preferred embodiment of the invention:

Fig. 1 is a plan view of a portion of the present building and combination air and wire distributing structure; and Fig. 2 is a cross sectional view of the structure shown in Fig. 1.

In general the present invention pertains to a building and combination air and wire distributing structure which may be used for the various purposes of ventilation, for exhausting air from within the building, for heating and/or for cooling a part or all of the building and also for general air conditioning purposes.

The invention contemplates a structure which finds particular use in a multi-storied building wherein a cellular metal floor, such as is illustrated in the United States patent to Young above referred to, forms the load supporting floor at one or more stories of the building, and is erected upon the usual beams constituting a part of the steel framework of the building. At each story of the building provision is made for forcing air into selected of the floor cells at one portion of the floor whereby the air may flow through the floor cells and be permitted to flow outwardly into selected portions of the building in order to provide the desired ventilation, heating or air conditioning of the building.

Selected cells or groups of cells of cellular metal floors have heretofore been extensively used as wire carrying ducts, and the cellular steel floors manufactured and sold by H. H. Robertson Company, of Pittsburgh, Pennsylvania, assignees of the Young patent above referred to, illustrate the type of floor which may and preferably will form the cellular flooring component of the present building and combination air and wiring distributing structure. In practice in such cellular metal floors selected cells are used for carrying the wiring for one or more types of electrical service, such for example as 110 volt electrical service, low tension electrical service, for telephone service and for other signal systems. The wiring systems for these various electrical services are usually brought into the building to a panel or other supply point and from such a panel the wiring is run through crossover ducts or headers extending transversely across a large number of the flooring cells either above or below the floor and usually from one side of the building to another. Suitable openings are provided to enable the proper wires of the different services to be fished from the supply headers or crossover ducts through the selected floor cells to be withdrawn at desired points in the building through outlets in the floor cells. In practice the cellular steel floor is manufactured in unit widths and standard lengths, each unit usually embodying a number of cells, usually four, and these floor units are erected in end to end relation and in contiguous side by side relation to form the complete floor. In practice also the crossover ducts or supply headers have comprised metal conduits which have been erected in contact with the upper or lower surfaces of the various cells of the several floor units across which these crossover ducts or headers have been extended.

While the foregoing structure of combination floor and wiring distributing system has proven successful in the large number of buildings in which the same has been employed during the last twenty years, the arrangement of crossover ducts or supply headers is not satisfactory when it is desired to also utilize some of the non-wire-carrying cells for conducting air heated to above room temperature, or systems for heating or air conditioning the building because of the transmission of heat from those cells carrying the heated air into the supply headers and the injury or liability of injury of the insulation of the wiring over a substantial period of time. Accordingly, the present invention contemplates a novel building structure embodying a cellular floor of the character described wherein the crossover ducts or heads are arranged to communicate with selected of the cooled air cells whereby to effect dissipation of the heat transmitted thereto by the hot air cells, thus preventing injury to the insulation of the wiring in the ducts and in the wire distributing cells. In practice the wiring cells are preferably arranged in transversely spaced groups and with the wiring for a particular service running through two or more cells of the group, and the air carrying cells may be disposed between adjacent groups of wiring cells.

Referring now to the drawings, in Figs 1 and 2 I have illustrated a sufficient portion of the present building and combination wire and air distributing structure to enable the invention to be understood. As therein illustrated, the structure includes a load supporting cellular metal floor, of the type above referred to, produced in accordance with the disclosure of the Young patent above referred to. This cellular metal floor in practice is made in standard units, and in the erection of these units in a building a series of the units are laid end to end over the supporting beams of the framework of the building and form in effect continuous raceways or cells, herein shown as four in number for each unit, which comprise potential conduits for carrying either wire or air from one part of a building to another. Preferably, however, each standard four-cell unit 10 may be used for wiring services and is preferably erected with enlarged cellular units 12, 14 on each side thereof so that, as illustrated in Figs. 1 and 2, four potential wiring ducts are interposed between each pair of air carrying cell units 12, 14. It will be understood that the present load supporting cellular metal floor may embody any form and number of potential wiring or potential air carrying cells provided that a series of groups of wiring cells are interposed laterally between a pair of potential air carrying cells. In practice a furred ceiling may be suspended from the load supporting floor as indicated at 16 in Fig. 2. The ceiling is preferably supported a short distance below the load supporting floor sufficient to permit air carrying supply ducts to be extended through the space between the floor and the ceiling.

As typical of an installation of the present building and combination wire and air distributing structure, I have shown in Fig. 1 a pair of supply air ducts 20, 22. The supply duct 20 transversely extended under the floor may be utilized for the supply of cold air and is connected by a header connection indicated at 23 to the cold air carrying cell 14. The supply duct 22 may be utilized to carry heated air, that is air heated to above room temperature, and this air duct 22 extends transversely under the floor, and both are of a size such as to pass through the space between the suspended ceiling 16 and the floor. The duct 22 is connected by the header connection 25 to the potential air duct 12 which will be hereinafter referred to as the "hot air duct."

For purposes of illustration the several potential wiring cells of the standard unit of the load supporting floor may be designated as cells 1, 2, 3 and 4, and it will be understood that electrical wiring will be run into one end of at least some of the cells of the floor unit at a point adjacent a wall or portion of the building at which the ends are exposed to permit such introduction of wiring into the cells, or in some instances the wiring may be introduced initially into the cells through suitable inlet openings at the top or bottom of the floor cells at a point adjacent the supply point or panel (not shown) to which the particular electrical service is supplied at the particular floor of the building under consideration. As herein shown, cells Nos. 1 and 3 have been designated as cells for carrying the wiring for 110 v. lighting services, and cells Nos. 2 and 4 have been designated as cells for carrying the wiring for the telephone services.

As herein illustrated, the transversely extended crossover ducts or headers indicated at 30, 31 are erected directly on top of the cellular metal floor and embedded in the concrete floor fill, the crossover ducts having openings 32 in the lower wall thereof for communication with selected of the underlying wire distributing cells. The upper walls of the headers 30, 31 are provided with openings aligned with access fittings 34 normally closed by a removable cover 35 disposed at the surface of the usual floor fill and floor finish. In the specific structure shown, the top of the header 30 is provided with an upturned rim 39B surrounding each opening 32, and a rim 39 depending from the cover is adapted to fit into the space between the header rim 38 and a protective cylindrical sleeve 40 erected on the header and preferably welded thereto for the purpose of preventing the floor fill from entering the crossover duct or header.

In accordance with the present invention in order to dissipate the heat transmitted to the crossover ducts 30, 31 by the underlying hot air carrying cells 12, the lower walls of the ducts are provided with openings 42 in communication with the cold air carrying cells 14, as illustrated in Fig. 2, so that in operation some of the cold air passing through the cells 14 may pass through the openings 42 and into the crossover ducts whereby to maintain a relatively cool temperature in the ducts by dissipation of the heat transmitted thereto by the hot air cells 12. It will be observed that some of the cold air directed into the crossover ducts 30, 31 may also pass through the openings 32 into the underlying wire distributing cells communicating therewith to maintain the cells in a relatively cool condition. Thus, the wiring in the crossover ducts and in the wire distributing cells is maintained in a relatively cool condition so as to avoid excessive heating and injury to the insulation of the wiring by the heat transmitted thereto by the hot air cells 12.

As illustrated in Fig. 2, each opening 32, 42 in the lower wall of the crossover duct is provided with a grommet, and in practice such openings may be made during erection of the cellular steel flooring, access being had through the rimmed openings in the upper wall of the crossover duct. The rimmed opening 50 in the upper wall of the duct in alignment with the opening 42 may be provided with a cover 52 providing a concealed access opening subsequently covered by the concrete floor fill as shown.

Having thus described the invention, what is claimed is:

A building and combination air and wire distributing structure comprising a cellular metal floor having adjacent metal cellular units erected side by side, one unit having a plurality of cells each of uniform cross sectional dimensions and each constituting a wiring duct, and the other adjacent units having cells of greater sectional dimensions than those of the first unit unit and constituting air carrying cells, means for conducting hot air and cold air from sources of supply to different selected of said air carrying cells, and elongated wire carrying crossover ducts extending transversely of the wire carrying and air carrying cells erected above and in contact with the cellular metal floor and in communication with the wire carrying cells, said cool air cells having openings in the upper wall thereof aligned with openings in the lower wall of said crossover duct at the points of intersection with said crossover ducts and communicating therewith for leading cool air into the crossover ducts, said crossover ducts having other openings in the lower wall thereof aligned with openings in the upper walls of selected of said wire carrying cells at the points of intersection thereof for distribution of the wiring from the crossover duct to said cells and through which air also passes from the crossover duct whereby to dissipate the heat transmitted thereto by the proximity of the hot air cells, each communicating opening between the air carrying cells and the crossover duct and between the crossover duct and the wire carrying cells having an access opening unit in the upper wall of said crossover duct in alignment with their respective communicating openings.

References Cited in the file of this patent
UNITED STATES PATENTS 2,041,965    Sargent  ---------------- May 26, 1936
2,783,639    Werner  ---------------- Mar. 5, 1957

OTHER REFERENCES

Sweet's 1954 Catalog, Sec. 2d/De, p. 8, Detroit Steel Products Co.